US009103568B2

(12) United States Patent
Beers et al.

(10) Patent No.: US 9,103,568 B2
(45) Date of Patent: Aug. 11, 2015

(54) COMPRESSOR HOUSING FOR AN AIR CYCLE MACHINE

(71) Applicant: Hamilton Sundstrand Corporation, Windsor Locks, CT (US)

(72) Inventors: Craig M. Beers, Wethersfield, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 211 days.

(21) Appl. No.: 13/957,561

(22) Filed: Aug. 2, 2013

(65) Prior Publication Data

US 2015/0033730 A1    Feb. 5, 2015

(51) Int. Cl.
| F24F 12/00 | (2006.01) |
| F25B 9/00 | (2006.01) |
| B64D 13/06 | (2006.01) |
| F25B 9/06 | (2006.01) |

(52) U.S. Cl.
CPC ............... *F25B 9/004* (2013.01); *B64D 13/06* (2013.01); *F25B 9/06* (2013.01); *F25B 2309/004* (2013.01); *F25B 2309/005* (2013.01); *F25B 2400/07* (2013.01)

(58) Field of Classification Search
CPC ............ F24F 12/00; F25B 9/06; F25B 9/004; F25B 2400/07; F25B 2309/004; F25B 2309/005; B64D 13/06
USPC ........ 62/87, 172, 401, 402; 415/170.1, 182.1; 417/406, 407; 60/456, 784
See application file for complete search history.

(56) References Cited

U.S. PATENT DOCUMENTS

| 3,428,242 A | 2/1969 | Rannenberg |
| 4,312,191 A * | 1/1982 | Biagini ..................... 62/402 |
| 4,482,303 A | 11/1984 | Acosta |
| 4,521,155 A | 6/1985 | Osborn |

(Continued)

FOREIGN PATENT DOCUMENTS

WO    WO 94/09276 A1    4/1994

OTHER PUBLICATIONS

Unpublished U.S. Appl. No. 13/869,563.

*Primary Examiner* — Mohammad M Ali
(74) *Attorney, Agent, or Firm* — Kinney & Lange, P.A.

(57) ABSTRACT

A component of an air cycle machine includes a fan housing portion, a compressor housing portion, a main bore housing radius, a static seal radius, a shroud pilot housing radius, and an insulator seal plate housing radius. The fan housing portion includes a shroud for a fan section. The compressor housing portion includes a shroud for a compressor air inlet, a shroud portion for a compressor blade section, and a shroud portion for a compressor air outlet. The main bore housing radius is arranged about a central axis and is configured to circumscribe a shaft arranged along the central axis, the main bore housing radius being between 1.9400 and 1.9440 inches. The static seal portion is arranged about the central axis and positioned longitudinally adjacent to the main bore housing portion. The static seal portion is configured to circumscribe a static seal defined by the shaft, and has a radius between 2.0420 and 2.0440 inches. The shroud pilot housing radius is arranged about the central axis. The shroud pilot housing radius is between 5.9440 and 5.9470 inches. The insulator seal plate housing radius is arranged about the central axis and is configured to mate with an adjacent turbine section component. The insulator seal plate housing radius is between 8.6380 and 8.6420 inches.

20 Claims, 2 Drawing Sheets

(56) References Cited

U.S. PATENT DOCUMENTS

| | | | |
|---|---|---|---|
| 4,932,207 A * | 6/1990 | Harris et al. | 60/799 |
| 5,014,518 A | 5/1991 | Thomson et al. | |
| 5,161,939 A | 11/1992 | Stadler | |
| 5,207,565 A * | 5/1993 | Roessler | 417/407 |
| 5,224,842 A * | 7/1993 | Dziorny et al. | 417/406 |
| 5,249,934 A * | 10/1993 | Merritt et al. | 417/406 |
| 5,309,735 A * | 5/1994 | Maher et al. | 62/402 |
| 5,311,749 A * | 5/1994 | McAuliffe et al. | 62/402 |
| 7,402,020 B2 * | 7/2008 | Beers et al. | 415/1 |
| 8,418,495 B2 | 4/2013 | Merritt et al. | |
| 2007/0134105 A1 * | 6/2007 | Beers et al. | 417/407 |
| 2012/0156008 A1 | 6/2012 | Chrabascz et al. | |
| 2013/0071239 A1 | 3/2013 | Beers et al. | |
| 2013/0098045 A1 | 4/2013 | Binek et al. | |
| 2013/0101400 A1 | 4/2013 | Binek et al. | |

* cited by examiner

COMPRESSOR HOUSING FOR AN AIR CYCLE MACHINE

BACKGROUND

The present invention relates to Air Cycle Machines (ACMs). ACMs may be used to compress air in a compressor section. The compressed air is discharged to a downstream heat exchanger and further routed to a turbine. The turbine extracts energy from the expanded air to drive the compressor. The air output from the turbine may be utilized as an air supply for a vehicle, such as the cabin of an aircraft. ACMs may be used to achieve a desired pressure, temperature, and humidity in the air that is transferred to the environmental control system of the aircraft.

ACMs often have a three-wheel or four-wheel configuration. In a three-wheel ACM, a turbine drives both a compressor and a fan which rotate on a common shaft. In a four-wheel ACM, two turbine sections drive a compressor and a fan on a common shaft.

Airflow must be directed into the fan section to the compressor section, away from the compressor section towards the heat exchanger, from the heat exchanger to the turbine or turbines, and from the final turbine stage out of the ACM. In at least some of these transfers, it is desirable to direct air radially with respect to the central axis of the ACM. To accomplish this, rotating nozzles may be used to generate radial in-flow and/or out-flow.

ACMs often have more than one housing section. The housings used in an ACM are used to contain airflow routed through the ACM, as well as rotating parts. Often, housing components are configured adjacent to seals and/or other housing components to achieve airflow containment.

SUMMARY

A housing component of an air cycle machine is disclosed. The air cycle machine component has specified dimensions, including a main bore housing radius, a static seal radius, a shroud pilot housing radius, and an insulator seal plate housing radius.

DETAILED DESCRIPTION

The dimensions of an air cycle machine housing are selected in order to achieve several goals. Reduced drag of rotating shaft on static shaft seal minimizes friction losses and transfers more turbine power to the compressor and fan. Optimized seal clearance is desirably minimized, in order to minimize compressor inlet flow lost through the seal. Shaft excursions, such as seals, result in intimate contact between shaft seal teeth and associated seal lands. The seal clearance losses are balanced against the frictional losses of seal drag during shaft excursions. Optimized clearance is maintained between the rotating shaft teeth and the seal land to reduce or eliminate sub-synchronous vibrations in foil bearings of the air cycle machine. Further, the leakage from excursions such as seals is prevented from dumping into part of the bearing cooling flow path. Excessive leakage into this flowpath could result in a blockage of cooling flow. Optimized seal sizing prevents the excessive leakage that could cause reduced bearing cooling flow and over-temperature of the bearing surfaces.

Figure 1:
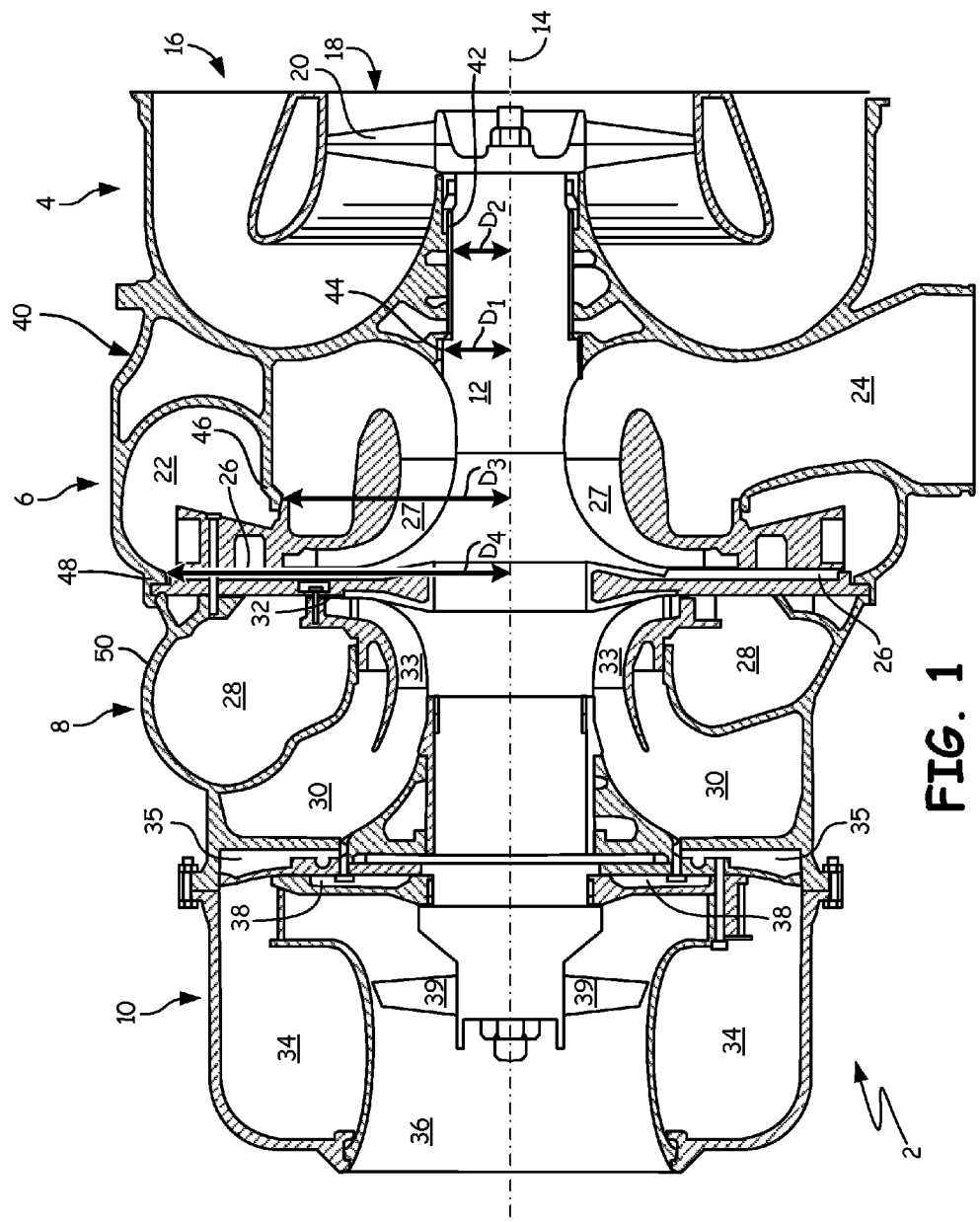
FIG. 1 is a cross-sectional view of an air cycle machine.

FIG. 1 is a cross-sectional view of ACM 2. ACM 2 is a four-wheel ACM, containing fan section 4, compressor section 6, first turbine section 8, and second turbine section 10, which are all connected to shaft 12. Shaft 12 rotates about central axis 14.

Each of fan section 4, compressor section 6, first turbine section 8, and second turbine section 10 are also connected to one another via shaft 12. Shaft 12 runs along central axis 14, and is connected to at least compressor nozzle 26, first stage turbine nozzle 32, and second stage turbine nozzle 38. Fan blades 20 may also be connected to shaft 12.

When working fluid passes through ACM 2, it is first compressed in compressor section 6, and then expanded in first turbine section 8 and second turbine section 10. Often, a first working fluid is heated or cooled in a heat exchanger (not shown) through which working fluid is routed as it passes between compressor section 6 and first turbine section 8. First turbine section 8 and second turbine section 10 extract energy from the working fluid, turning shaft 12 about central axis 14. Meanwhile, a second working fluid is routed through the same heat exchanger by fan section 4. For example, the first working fluid may be routed from a bleed valve of a gas turbine engine through compressor section 6, to a heat exchanger, to first turbine section 8, then to second turbine section 10, and then to the environmental control system of an aircraft. The second working fluid may be ram air that is pulled by fan section 4 through the same heat exchanger to cool the first working fluid to a desired temperature before routing of the first working fluid to the turbine sections 8 and 10. By compressing, heating, and expanding the working fluid, the output provided at the second turbine 10 may be adjusted to a desired temperature, pressure, and/or relative humidity.

Fan section 4 includes fan inlet 16 and fan outlet 18. Fan inlet 16 is an opening in ACM 2 that receives working fluid from another source, such as a ram air scoop. Fan outlet 18 allows working fluid to escape fan section 4. Fan blades 20 may be used to draw working fluid into fan section 4.

Compressor section 6 includes compressor inlet 22, compressor outlet 24, compressor nozzle 26, and compressor blades 27. Compressor inlet 22 is a duct defining an aperture through which working fluid to be compressed is received from another source. Compressor outlet 24 allows working fluid to be routed to other systems after it has been compressed. Compressor nozzle 26 is a nozzle section that rotates through working fluid in compressor section 6. Compressor nozzle 26 directs working fluid from compressor inlet 22 to compressor outlet 24 via compressor blades 27. Compressor nozzle 26 is a radial out-flow rotor.

First turbine section 8 includes first stage turbine inlet 28, first stage turbine outlet 30, first stage turbine nozzle 32, and first turbine blades 33. First stage turbine inlet 28 is a duct defining an aperture through which working fluid passes prior to expansion in first turbine section 8. First stage turbine outlet 30 is a duct defining an aperture through which working fluid (which has expanded) departs first turbine section 8. First stage turbine nozzle 32 is a nozzle section that rotates through working fluid in first turbine section 8. First stage turbine nozzle 32 cooperates with first stage turbine blades 33 to extract energy from working fluid passing therethrough, driving the rotation of first turbine section 8 and attached components, including shaft 12, fan section 4, and compressor section 6. First stage turbine nozzle 32 is a radial in-flow rotor.

Second turbine section 10 includes second stage turbine inlet 34, second stage turbine outlet 36, second stage turbine nozzle 38, and second stage turbine blades 39. Second stage turbine inlet 34 is a duct defining an aperture through which working fluid passes prior to expansion in second turbine section 10. Second stage turbine outlet 36 is a duct defining an aperture through which working fluid (which has expanded) departs second turbine section 10. Second stage turbine nozzle 38 is a nozzle section that cooperates with second stage turbine blades 39 to extract energy from working fluid passing therethrough, driving the rotation of second turbine section 10 and attached components, including shaft 12, fan section 4, and compressor section 6. In particular, second stage turbine nozzle 38 is a radial out-flow rotor. Working fluid passes from second stage turbine inlet 34 to cavity 35, where it is incident upon second stage turbine nozzle 38. Working fluid then passes between nozzle blades (not shown). Turbine nozzle 38 is stationary, and the nozzle vanes guide the flow for optimum entry into the turbine rotor. The flow of causes turbine blades 39 to rotate and turn shaft 12.

Shaft 12 is a rod, such as a titanium tie-rod, used to connect other components of ACM 2. Shaft 12 includes a seal portion arranged partway along its length. Central axis 14 is an axis with respect to which other components may be arranged.

Fan section 4 is connected to compressor section 6. In particular, fan outlet 18 is coupled to compressor inlet 22. Working fluid is drawn through fan inlet 16 and discharged through fan outlet 18 by fan blades 20. Working fluid from fan outlet 18 is routed to compressor inlet 22 for compression in compressor section 6. Similarly, compressor section 6 is coupled with first turbine section 8. Working fluid from compressor outlet 24 is routed to first stage turbine inlet 28.

Fan section 4 and compressor section 6 share housing 40. Housing 40 encloses the moving parts and air paths through fan section 4 and compressor section 6. The size and geometry of housing 40 define the flow of air through ACM 2. For example, housing 40 is arranged about shaft 12 so as to prevent excessive airflow around shaft 12. In particular, a static seal portion is included in shaft 12, directly adjacent to static seal portion 44. The outer radius of the seal portion is set such that a seal is formed with static seal portion 44 of housing 40. Thus, the outer radius of shaft 12 at the static seal portion is equal to or slightly less than static seal radius D1.

Housing 40 has specific dimensions to coordinate with adjacent housing sections, such as the housing surrounding turbine section 8. Housing 40 includes main bore housing portion 42, static seal portion 44, shroud pilot housing 46, and insulator seal plate 48.

Static seal portion 44 is the portion of housing 40 that circumscribes shaft 12 at the longitudinal are at which shaft 12 includes a seal. In this way, static seal portion 44 prevents flow of fluid between housing 40 and shaft 12. The radius of housing 40 from central axis 14 to static seal portion 44 is illustrated as static seal radius D1. Static seal radius D1 is between 5.1867 and 5.1918 cm (2.0420 and 2.0440 in.). More preferably, a static seal radius D1 may be between 5.1904 and 5.1930 cm (2.0435 and 2.0445 in.).

Main bore housing portion 42 is the portion of housing 40 that circumscribes shaft 12 so as to prevent excessive airflow around shaft 12. The radius of housing 40 from central axis 14 to main bore housing portion 42 is illustrated as central bore inner radius D2. Central bore inner radius D2 is between 4.9276 and 4.9378 cm (1.9400 and 1.9440 in.). More preferably, main bore housing radius D2 may be between 4.9301 and 4.9352 cm.

Shroud pilot housing 46 is defined a portion of housing 40 at the point where the radial distance between central axis 14 and housing 40 is at a local minimum. Shroud pilot housing portion 46 is configured to mate with a complimentary feature, turbine housing 50. By coupling with turbine housing 50, shroud pilot housing 46 prevents working fluid passing through the compressor inlet 22 from intermixing with compressed fluid at the compressor outlet 24. The radius of housing 40 from central axis 14 to shroud pilot housing 46 is illustrated as shroud pilot housing radius D3. Shroud pilot housing radius D3 is between 15.098 and 15.105 cm (5.9440 and 5.9470 in.). More preferably, shroud pilot housing radius D3 may be between 15.099 and 15.104 cm.

Insulator seal plate 48 is a portion of housing 40 that extends furthest towards turbine section 8. Furthermore, insulator seal plate 48 is also at a point where the radial distance between central axis 14 and housing 40 is at a local minimum. Insulator seal plate 48 is also configured to mate with turbine housing 50. Insulator seal plate 48 cooperates with turbine housing 50 to prevent fluid egress from compressor inlet 22. The radius of housing 40, from central axis 14 to insulator seal plate 48, is illustrated as insulator seal plate radius D4. Insulator seal plate housing radius D4 is between 21.941 and 21.951 cm (8.6380 and 8.6420 in.). More preferably, insulator seal plate housing radius D4 may be between 21.943 and 21.948 cm.

Figure 2:
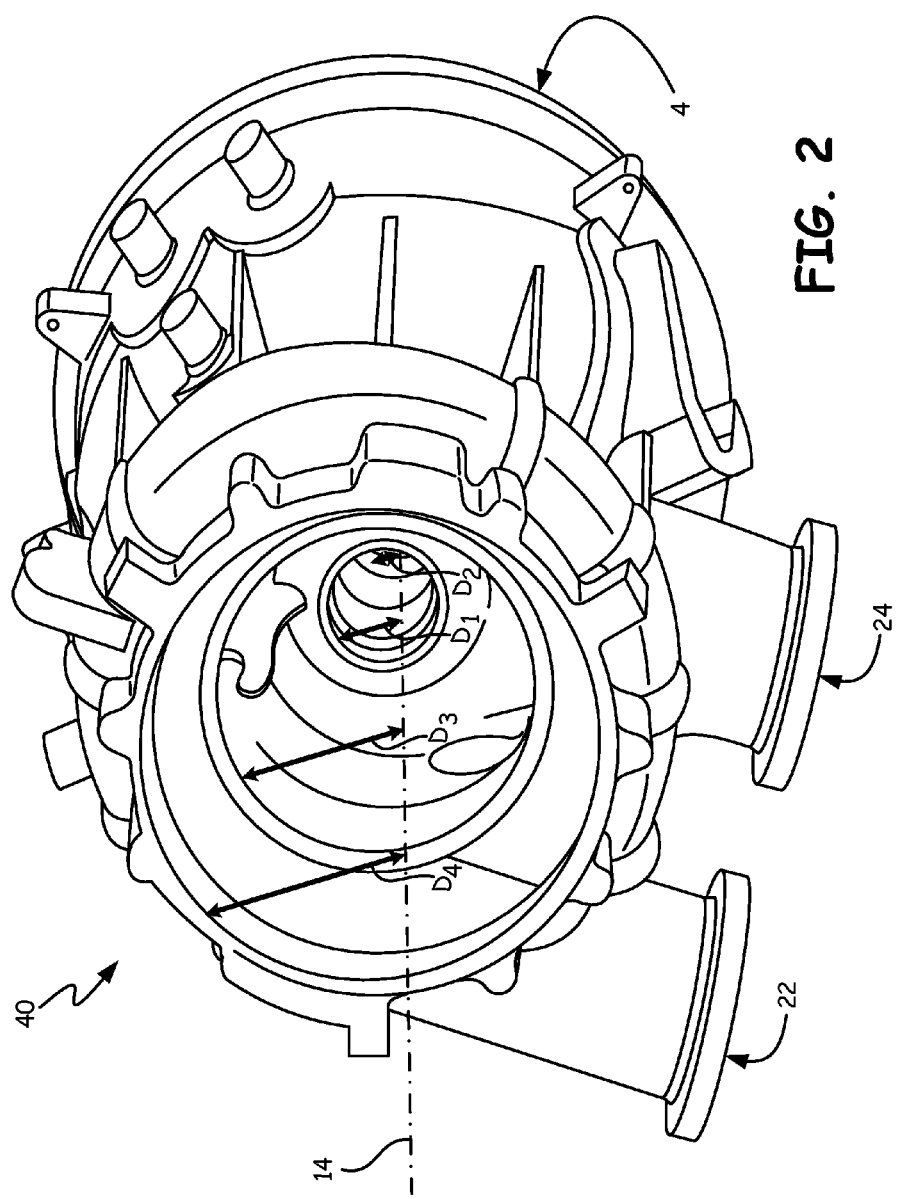
FIG. 2 is a perspective view of a compressor housing of the air cycle machine.

FIG. 2 is a perspective view of housing 40, illustrating a static seal radius D1, central bore inner radius D2, shroud pilot housing radius D3, and insulator seal plate radius D4. Components of ACM 2 of FIG. 1, including the adjacent housing of turbine section 8 and shaft 12, have been removed to more clearly illustrate the specific dimensions of housing 40.

FIG. 2 illustrates compressor inlet 22 and compressor outlet 24. As shown in FIG. 2, fan blades 20 (FIG. 1) of fan section 4 are hidden behind housing 40, whereas the interior of compressor section 6 is exposed but circumscribed by housing 40. As previously described with respect to FIG. 1, a static seal portion D1, main bore housing radius D2, shroud pilot housing radius D3, and insulator seal plate housing radius D4 have specific ranges of dimensions that are optimal.

Discussion of Possible Embodiments

A housing of an air cycle machine includes a main bore housing portion arranged about a central axis and configured to circumscribe a shaft arranged along the central axis. The main bore housing has a central bore inner radius between 4.9276 and 4.9378 cm. A static seal portion is arranged about the central axis and positioned longitudinally adjacent to the main bore housing portion. The static seal portion is configured to circumscribe a static seal defined by the shaft. The static seal portion has a static seal radius between 5.1867 and 5.1918 cm. A shroud pilot housing portion is arranged about the central axis. The shroud pilot housing portion has a shroud pilot radius between 15.098 and 15.105 cm. An insulator seal plate housing portion is arranged about the central axis and configured to mate with an adjacent turbine section component. The insulator seal plate housing portion has an insulator seal plate radius between 21.941 and 21.951 cm.

The main bore housing radius may be between 4.9301 and 4.9352 cm. The static seal radius may be between 5.1905 and 5.1930 cm. The shroud pilot housing radius may be between 15.099 and 15.104 cm. The insulator seal plate housing radius may be between 21.943 and 21.948 cm. The turbine section component may be a turbine section housing. The shroud housing pilot portion may be configured to mate with the adjacent turbine section component.

An air cycle machine includes a shaft. The air cycle machine further includes a fan section arranged around a portion of the shaft. The fan section is capable of routing a first working fluid. The air cycle machine includes a compressor section arranged adjacent to the fan section and positioned around the shaft. The compressor section is capable of compressing a second working fluid. The turbine section is arranged adjacent to the compressor section and positioned around the shaft. The turbine section is capable of converting potential energy of the second working fluid to rotational energy. A heat exchanger is capable of exchanging heat between the first working fluid and the second working fluid. A housing forms a part of both the fan section and the compressor section. The housing includes a main bore housing portion arranged to circumscribe the shaft. The main bore housing has a central bore inner radius between 1.9400 and 1.9440 inches. A static seal portion is arranged about the shaft and positioned longitudinally adjacent to the main bore housing portion. The static seal portion is configured to circumscribe a seal defined by the shaft. The static seal portion having a static seal radius between 2.0420 and 2.0440 inches. A shroud pilot housing portion is arranged about the shaft. The shroud pilot housing portion has a shroud pilot housing radius between 5.9440 and 5.9470 inches. An insulator seal plate housing portion is arranged about the central axis and configured to mate with an adjacent turbine section component. The insulator seal plate housing portion has an insulator seal plate housing radius between 8.6380 and 8.6420 inches.

The second working fluid may pass through the heat exchanger located between the compressor section and the turbine section. The first working fluid may pass through a ram air inlet prior to being routed to the fan section. The second working fluid may pass through a bleed air valve prior to being routed to the compressor section. The fan section, the compressor section, and the turbine section may be connected by the shaft to form a single spool. The shaft may be a tie rod. The air cycle machine may also include a second turbine section that receives the second working fluid from the turbine section. The turbine section may route the second working fluid to an environmental control system. The main bore housing radius may be between 4.9301 and 4.9352 cm. The static seal radius may be between 5.1905 and 5.1930 cm. The shroud pilot housing radius may be between 15.099 and 15.104 cm. The insulator seal plate housing radius may be between 21.943 and 21.948 cm.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A housing of an air cycle machine, the housing comprising:
   a main bore housing portion arranged about a central axis and configured to circumscribe a shaft arranged along the central axis, the main bore housing having a central bore inner radius between 4.9276 and 4.9378 cm;
   a static seal portion arranged about the central axis and positioned longitudinally adjacent to the main bore housing portion, the static seal portion configured to circumscribe a static seal defined by the shaft, the static seal portion having a static seal radius between 5.1867 and 5.1918 cm;
   a shroud pilot housing portion arranged about the central axis, the shroud pilot housing portion having a shroud pilot radius between 15.098 and 15.105 cm; and
   an insulator seal plate housing portion arranged about the central axis and configured to mate with an adjacent turbine section component, the insulator seal plate housing portion having an insulator seal plate radius between 21.941 and 21.951 cm.

2. The component of claim 1 wherein the main bore housing radius is between 4.9301 and 4.9352 cm.

3. The component of claim 1 wherein the static seal radius is between 5.1905 and 5.1930 cm.

4. The component of claim 1 wherein the shroud pilot housing radius is between 15.099 and 15.104 cm.

5. The component of claim 1 wherein the insulator seal plate housing radius is between 21.943 and 21.948 cm.

6. The component of claim 1, wherein the turbine section component is a turbine section housing.

7. The component of claim 1, wherein the shroud housing pilot portion is configured to mate with the adjacent turbine section component.

8. An air cycle machine comprises:
   a shaft;
   a fan section arranged around a portion of the shaft, the fan section capable of routing a first working fluid;
   a compressor section arranged adjacent to the fan section and positioned around the shaft, the compressor section capable of compressing a second working fluid;
   a turbine section arranged adjacent to the compressor section and positioned around the shaft, the turbine section capable of converting potential energy of the second working fluid to rotational energy;
   a heat exchanger capable of exchanging heat between the first working fluid and the second working fluid; and
   a housing that forms a part of both the fan section and the compressor section, the housing comprising:
     a main bore housing portion arranged to circumscribe the shaft, the main bore housing having a central bore inner radius between 1.9400 and 1.9440 inches;
     a static seal portion arranged about the shaft and positioned longitudinally adjacent to the main bore housing portion, the static seal portion configured to circumscribe a seal defined by the shaft, the static seal portion having a static seal radius between 2.0420 and 2.0440 inches;
     a shroud pilot housing portion arranged about the shaft, the shroud pilot housing portion having a shroud pilot housing radius between 5.9440 and 5.9470 inches; and
     an insulator seal plate housing portion arranged about the central axis and configured to mate with an adjacent turbine section component, the insulator seal plate housing portion having an insulator seal plate housing radius between 8.6380 and 8.6420 inches.

9. The air cycle machine of claim 8, wherein the second working fluid passes through the heat exchanger between the compressor section and the turbine section.

10. The air cycle machine of claim 8, wherein the first working fluid passes through a ram air inlet prior to being routed to the fan section.

11. The air cycle machine of claim 8, wherein the second working fluid passes through a bleed air valve prior to being routed to the compressor section.

12. The air cycle machine of claim 8, wherein the fan section, the compressor section, and the turbine section are connected by the shaft to form a single spool.

13. The air cycle machine of claim 8, wherein the shaft is a tie rod.

14. The air cycle machine of claim 8, and further comprising a second turbine section that receives the second working fluid from the turbine section.

15. The air cycle machine of claim 8, wherein the turbine section routes the second working fluid to an environmental control system.

16. The air cycle machine of claim 8 wherein the main bore housing radius is between 4.9301 and 4.9352 cm.

17. The air cycle machine of claim 8 wherein the static seal radius is between 5.1905 and 5.1930 cm.

18. The air cycle machine of claim 8 wherein the shroud pilot housing radius is between 15.099 and 15.104 cm.

19. The air cycle machine of claim 8 wherein the insulator seal plate housing radius is between 21.943 and 21.948 cm.

20. The air cycle machine of claim 8, wherein the shroud housing pilot portion is configured to mate with the adjacent turbine section component.

\* \* \* \* \*